United States Patent
Ding et al.

(10) Patent No.: US 10,884,789 B2
(45) Date of Patent: Jan. 5, 2021

(54) PROCESS TRACKING

(71) Applicant: International Business Machines Corporation, Armonk, NY (US)

(72) Inventors: Zhaohui Ding, Beijing (CN); Chun Lin Yang, Xian (CN); Xun Pan, Xian (CN); Rong Song Shen, Beijing (CN); Xiu Qiao Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 16/192,875

(22) Filed: Nov. 16, 2018

(65) Prior Publication Data

US 2020/0159567 A1 May 21, 2020

(51) Int. Cl.
*G06F 9/46* (2006.01)
*G06F 9/48* (2006.01)

(52) U.S. Cl.
CPC .................. *G06F 9/485* (2013.01)

(58) Field of Classification Search
None
See application file for complete search history.

(56) References Cited

U.S. PATENT DOCUMENTS

| 8,640,137 | B1 | 1/2014 | Bostic et al. |
| 8,706,798 | B1 | 4/2014 | Suchter et al. |
| 9,747,127 | B1 | 8/2017 | Florissi et al. |
| 2006/0168584 | A1 | 7/2006 | Dawson et al. |
| 2006/0195508 | A1 | 8/2006 | Bernardin et al. |
| 2006/0225075 | A1 | 10/2006 | Mankovski et al. |
| 2017/0220386 | A1 | 8/2017 | Chin et al. |
| 2017/0237682 | A1* | 8/2017 | Xue .................... G06F 9/5038 709/226 |

OTHER PUBLICATIONS

Altair, "Discover Altair Software Asset Optimization (SAO) and learn how to right-size your organizations software investments," http://www.pbsworks.com/, printed Aug. 15, 2018, 3 pgs.

IBM, "IBM Spectrum LSF Suites—Overview," https://www.ibm.com/us-en/marketplace/hpc-workload-management, printed Aug. 15, 2018, 1 pg.

Slurm, "Workload Manager, Version 17.11," https://slurm.schedmd.com/, printed Aug. 15, 2018, last modified Jun. 6, 2018, 4 pgs.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

*Primary Examiner* — Gregory A Kessler
(74) *Attorney, Agent, or Firm* — Jorge R. Maranto; Robert Sullivan

(57) ABSTRACT

A method and system for process tracking is disclosed. A first process is associated with an identity of a job, wherein the first process is launched by an outsourcing process to process the job. A second process is created locally. The second process is associated with the identity of the job to enable the second process to manage the first process based on the identity.

15 Claims, 9 Drawing Sheets

```
[root@onegui Blender]# cat /proc/18236/environ | tr '\0' '\n' | grep JOBID
JOBID=2818
```

FIG. 9A

```
[root@onegui user.slice]# pwd
/sys/fs/cgroup/memory/user.slice
[root@onegui user.slice]# cat cgroup.procs | grep 18236
18236
```

FIG. 9B

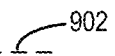

```
[root@onegui user.slice]# echo 18236 > ../lsf/job.2818/cgroup.procs
[root@onegui user.slice]# cat cgroup.procs | grep 18236
[root@onegui user.slice]# cat ../lsf/job.2818/cgroup.procs
18236
[root@onegui user.slice]#
```

PROCESS TRACKING

BACKGROUND

The present disclosure relates to the field of process management, and more specifically, to methods and systems for tracking processes in a computer system.

SUMMARY

According to one embodiment of the present disclosure, there is provided a computer-implemented method. The method comprises: associating a first process with an identity of a job, wherein the first process is launched by an outsourcing process to process the job; locally creating a second process; and associating the second process with the identity of the job to enable the second process to manage the first process based on the identity.

In another aspect, a computer-implemented system is disclosed. The system may include one or more processors; a memory coupled to at least one of the one or more processors; a set of computer program instructions stored in the memory and executed by at least one of the one or more processors to perform actions of the above method.

In yet another aspect, a computer program product is disclosed. The computer program product comprises a computer readable storage medium having program instructions embodied therewith. When executed on one or more processors, the instructions may cause the one or more processors to perform the above method.

According to another embodiment of the present invention, there is provided a computer-implemented method. The method comprises: obtaining an identity of a job; determining a first process associated with the identity of the job from descendant processes of an outsourcing process, wherein the first process is launched by the outsourcing process to process the job; and managing the first process.

In another aspect, a computer-implemented system is disclosed. The system may include one or more processors; a memory coupled to at least one of the one or more processors; a set of computer program instructions stored in the memory and executed by at least one of the one or more processors to perform actions of the above method.

In yet another aspect, a computer program product is disclosed. The computer program product comprises a computer readable storage medium having program instructions embodied therewith. When executed on one or more processors, the instructions may cause the one or more processors to perform the above method.

It is to be understood that the Summary is not intended to identify key or essential features of implementations of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 7A to FIG. 7D show an example procedure of requesting an outsourcing process to launch a process according to an embodiment of the present disclosure;

FIG. 9A to FIG. 9C show an example procedure of managing the first process based on an identity of a job according to an embodiment of the present disclosure.

DETAILED DESCRIPTION

Figure 1:
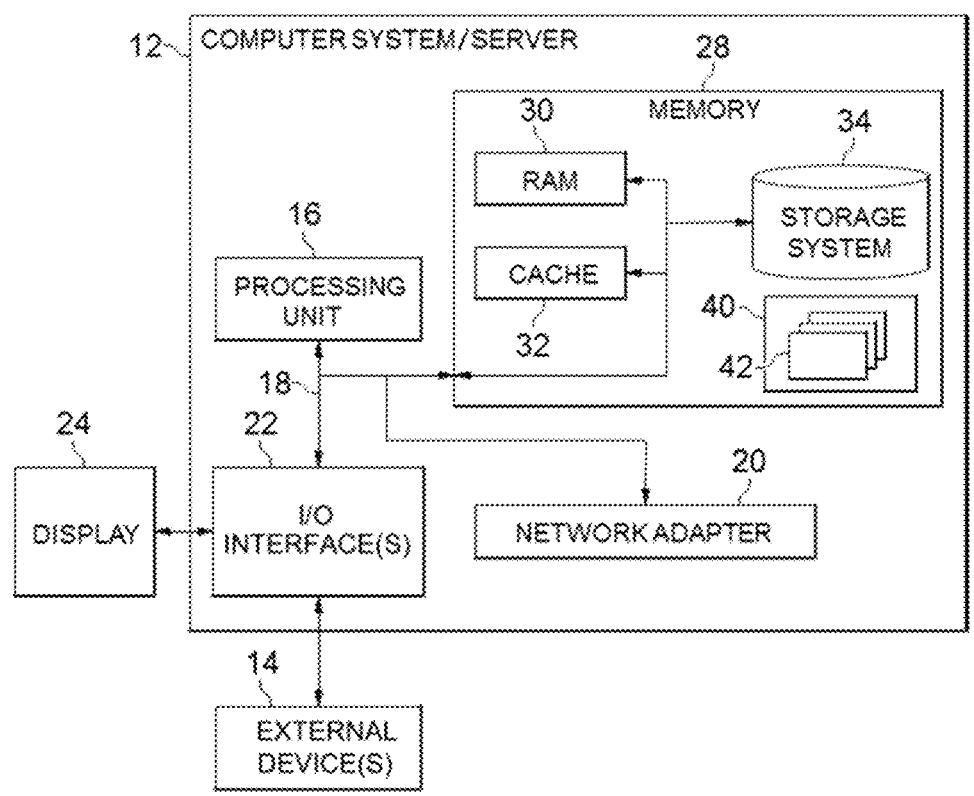
FIG. 1 depicts a cloud computing node according to an embodiment of the present disclosure.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
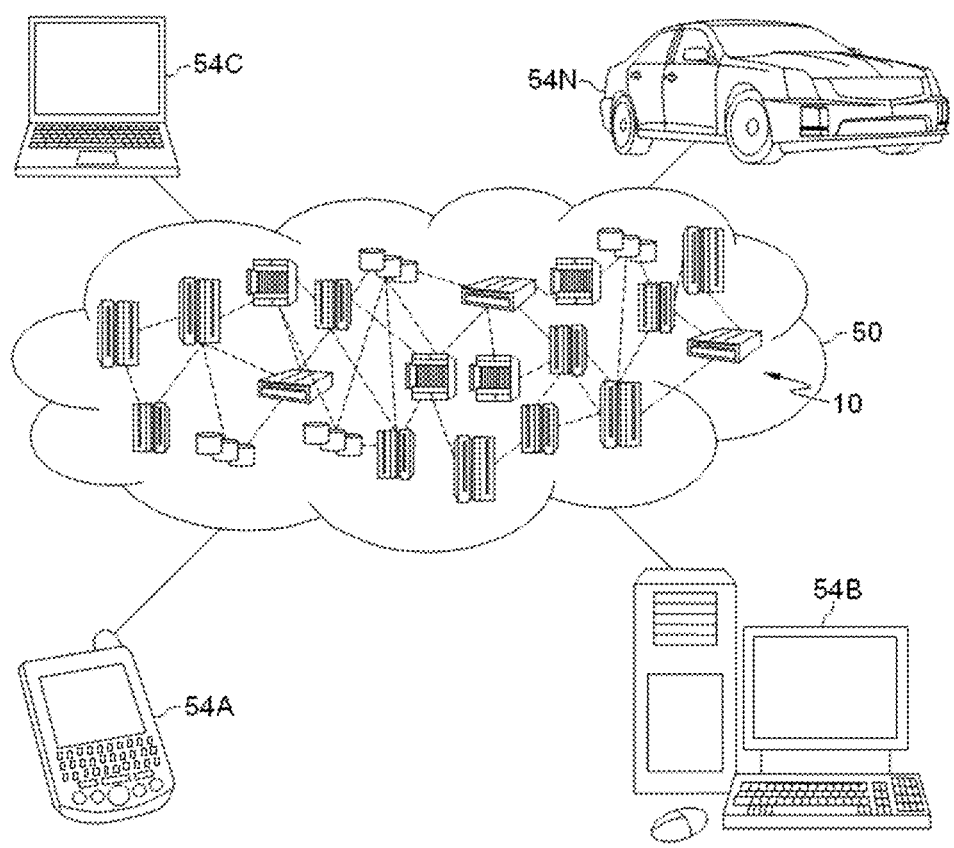
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
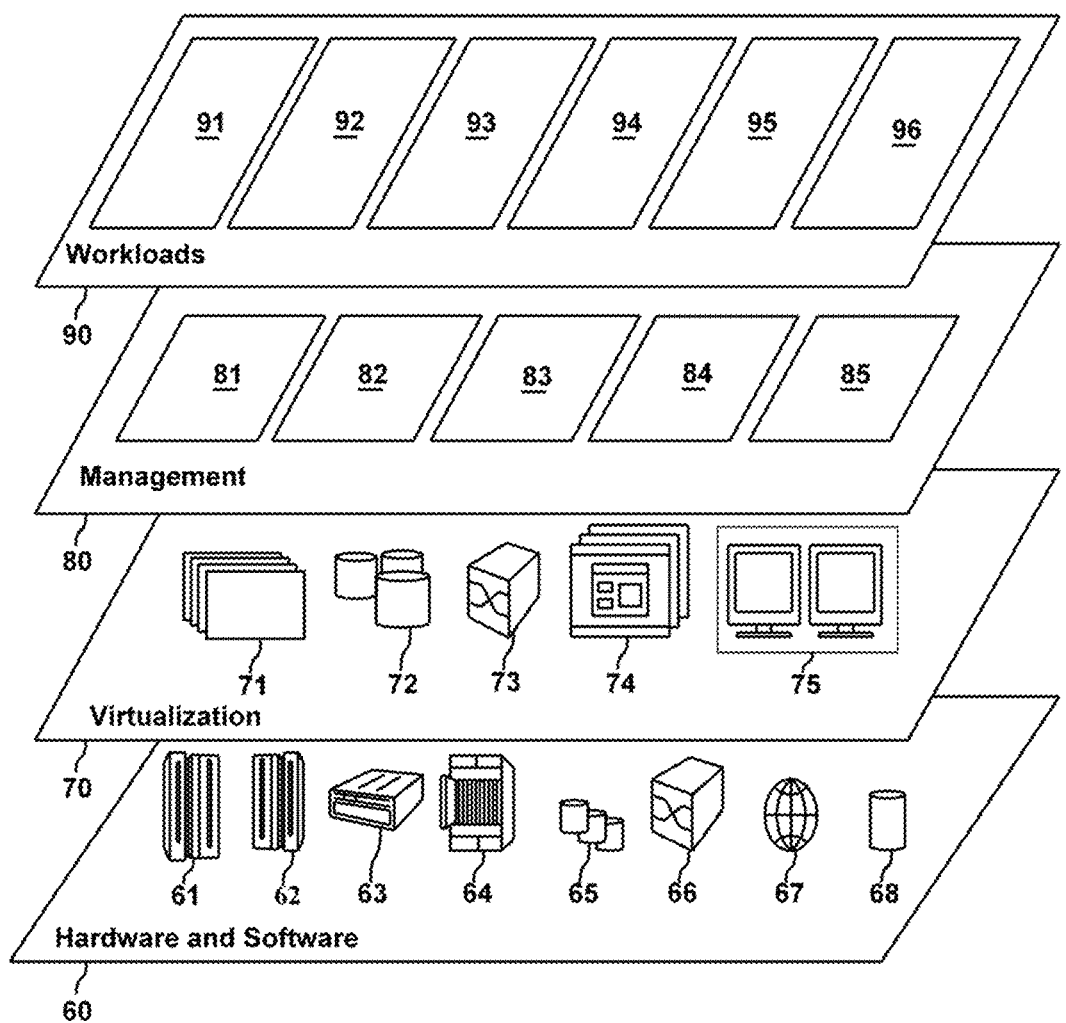
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and process tracking 96. The process tracking 96 may implement the solution for monitoring the status of a child process launched by an outsourcing process by locally creating a shadow process for the local job process as described below.

In a distributed job scheduling system, it is usually required to track and monitor status of a job being processed, for example, for the purpose of load balance, resource scheduling, and process control. As known, a process may launch one or more child processes to perform a job, and the launched one or more child processes may be automatically added to a monitor list associated with the job. As an example, in Linux system, a kernel feature called "cgroup" may act as a monitor list for a job. In particular, a "cgroup" may be used to limit, account for, and isolate the resource usage (such as usage of CPU, memory, disk I/O, network connections, etc.) of a collection of processes from each other.

Sometimes, a process for processing a job (referred to "job process") does not launch child processes by itself. Instead, the job process may request an outsourcing process such as a system daemon process to launch one or more child processes to perform respective tasks of the job. Since the launched process is not directly launched by the job process, the system may not be aware of the relationship between the job and these child processes. Then, the system may lose control of the launched process due to the lack of information about which job the launched process belongs to.

Figure 4:
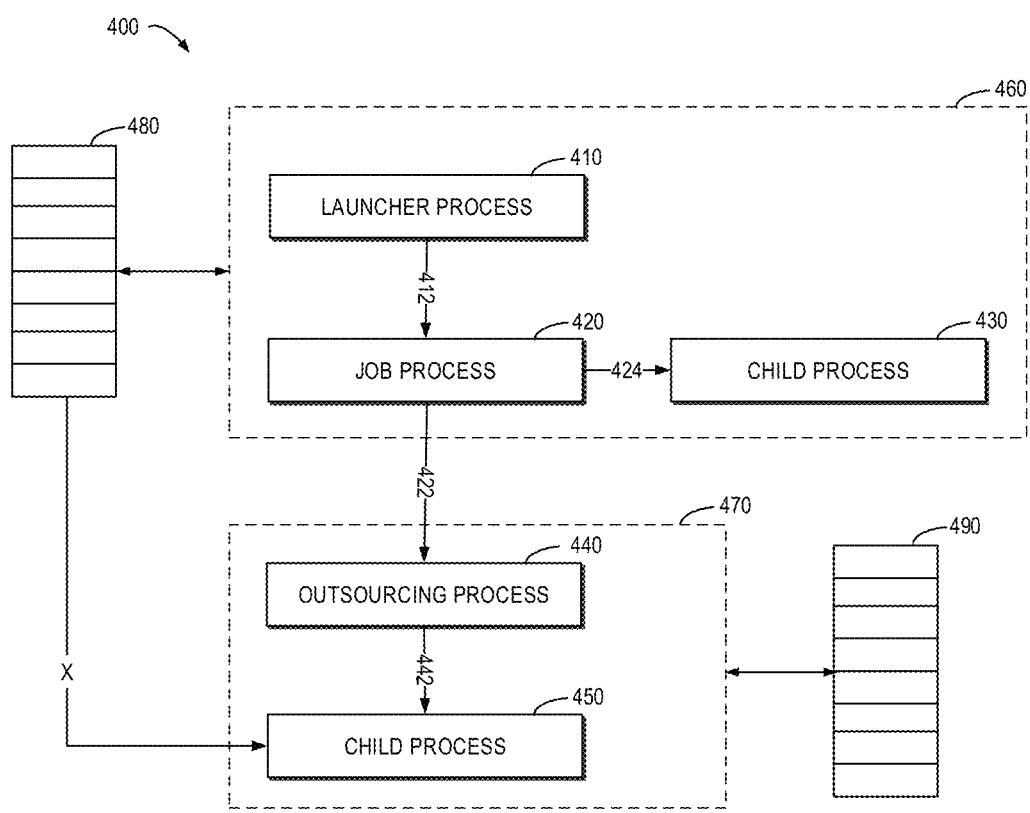
FIG. 4 is a block diagram illustrating launching a process by an outsourcing process according to a conventional method.

FIG. 4 shows a schematic diagram 400 for launching a process by an outsourcing process according to a conventional approach. As shown in FIG. 4, in response to a request for processing a job, a launcher process 410 may be first launched. The launcher process 410 may launch (412) a job process 420. In some cases, the job process 420 may perform the job 460 by itself. Alternatively, the job process 420 may further launch (424) a child process 430 to perform the job 460. As the job process 420 and the child process 430 are both launched by the launcher process 410, the job process 420 and the child process 430 may be recorded in a process tree of the job 460 for monitoring.

Additionally, as shown in FIG. 4, there is provided a monitor list 480 which is associated with the job 460. As stated above, the monitor list 480 may be used to, for example, limit, account for, and isolate the resource usage (such as usage of CPU, memory, disk I/O, network connections, etc.) of the launcher process 410, the job process 420 and the child process 430.

In some cases, the job process 420 may request (422) an outsourcing process 440 to launch (442) a child process (450) to perform the job 460. Since the child process 450 is directly launched by the outsourcing process 440, the child process 450 would be recorded in a process tree of an outsourcing job 470, rather than the process tree of the job 460. In other words, the child process 450 is monitored through a monitor list 490 associated with the outsourcing job 470.

In this case, neither the monitor list 480 nor the monitor list 490 is aware of the relationship between the job 460 and the child process 450, though the child process 450 is in fact created for performing the job 460. As a result, the status of the child process 450 cannot be monitored through the monitor list 480 associated with the job 460, and the child process 450 therefore cannot be managed with respect to the job 460. For example, in this case, if a user requests to kill all the processes associated with the job 460, the child process 450 would not be killed by the system due to the unawareness of the relationship between the child process 450 and the job 460.

Additionally, the job process 420 may be a kind of terminal process, such as a gnome-terminal in a Linux system. In this case, the task for the job process 420 is merely to communicate with the outsourcing process 440, and the job process 420 may terminate upon receiving a success indication from the outsourcing process 440 that the child process 450 has been launched. The launcher process 410 may also be terminated due to there being no working child process of the launcher process 410. As a result, the job 460 may be considered, mistakenly, as having been completed, and the monitor list 480 associated with the job 460 may then be freed. However, the child process 450 is still operating, at that point of time, to perform the job 460. That is, the status information collected for the job 460 through the monitor list 480 is incomplete, and the child process 450, which is launched by the outsourcing process 440 to perform the job 460, is completely ignored by the monitor list 480. Accordingly, the resources used by the job 460, for example, cannot be accurately determined, which may affect the load balance and job scheduling of a system.

In order to at least partially solve one or more of the above problems and other potential problems, example embodiments of the present disclosure propose a solution for process tracking. In general, a child process launched by an outsourcing process is managed by launching a local shadow process. An identity of a job to be processed may be assigned to both the child process and the shadow process. The shadow process may manage the child process launched by an outsourcing process using the identity of the job. In this way, it is possible to monitor the status of the child process launched by an outsourcing process, facilitating the efficient management of the job.

Figure 5:
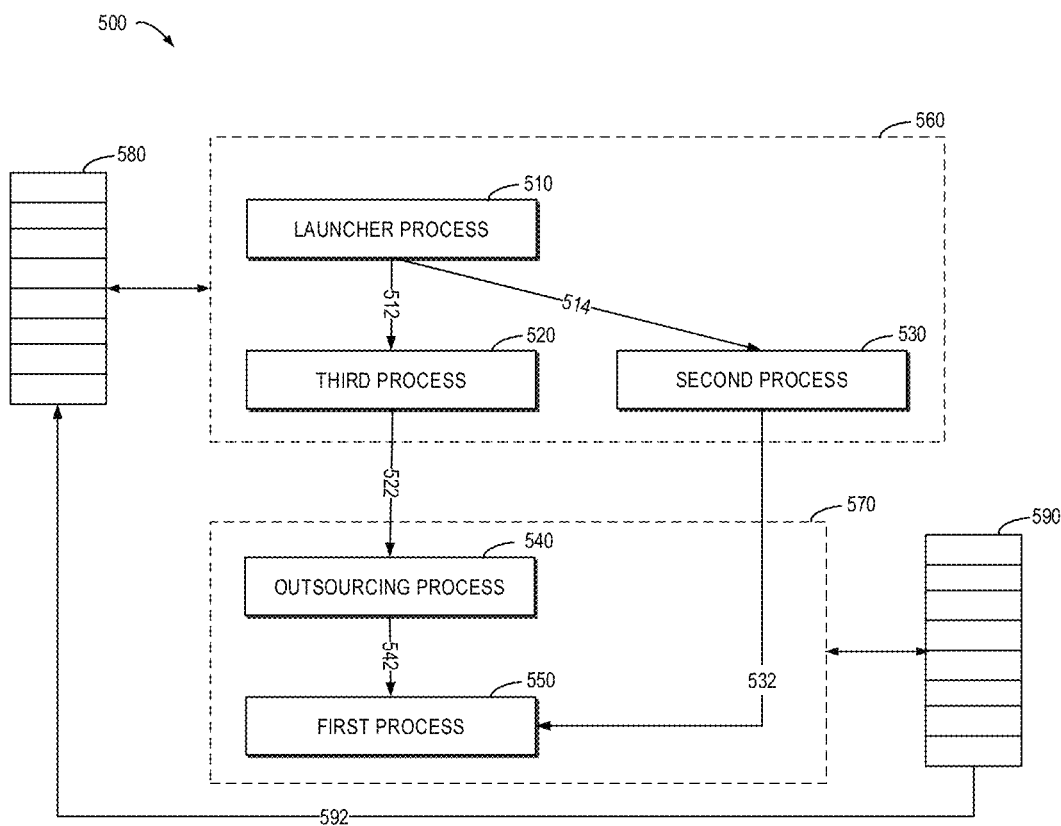
FIG. 5 is a block diagram illustrating launching a process by an outsourcing process according to an embodiment of the present disclosure.

FIG. 5 illustrates a schematic diagram 500 for launching a process by an outsourcing process according to an embodiment of the disclosure. In embodiments of FIG. 5, upon a request for processing a job 560, a launcher process 510 may be launched first by a job processing system. An example of the job processing system is a Load Sharing Facility (LSF) in a Linux system. For the purpose of processing the job 560, the launcher process 510 launches (512) a job process referred to as "third process 520". In addition, the launcher process 510 locally launches (514) a shadow process for the third process 520 referred to as "second process" 530. As used herein, the term "locally" means that the second process 530 and/or the third process 530 are created in the local system where the launcher process 510 is executed.

Since the third process 520 and the second process 530 are both launched by the launcher process 510, the third process 520 and the second process 530 may be recorded in a process tree of the job 560, and these processes relating to the job 560 may be monitored through a monitor list 580 associated with the job 560.

Additionally, in some embodiments, the third process 520 may communicate with (522) an outsourcing process 540 to launch (542) a child process referred to as "first process 550" to perform the job 560. For example, the third process 520 may send a request to outsourcing process 540 to launch the first process 550. For the purpose of a quick determination of the first process 550, the launcher process may associate both the first process 550 and the second process 530 with an identity of the job 560. Therefore, the second process 530 may be enabled to manage the first process 550 based on the identity of the job 560.

Further, since the second process 530 is still operating even after the termination of the third process 520, the launcher process 510 would not be terminated and the monitor list 580 associated with the job 560 would not be freed. In this case, there is provided a possibility to manage the first process 550 through the monitor list 580 associated with the job 560.

Figure 6:
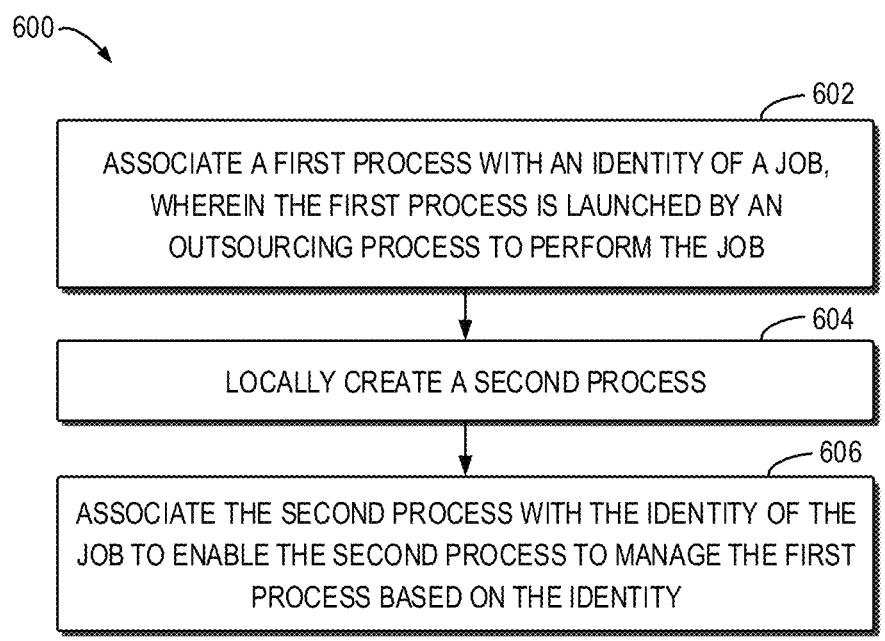
FIG. 6 is a flowchart of a method for tracking processes according to an embodiment of the present disclosure.

FIG. 6 shows a flowchart of a method 600 for tracking processes by the launcher process 510 according to an embodiment of the present disclosure.

At block 602, the launcher process 510 associates a first process 550 with an identity of a job 560, wherein the first process 550 is launched by an outsourcing process 540 to perform the job 560.

In some embodiments, as illustrated in FIG. 5, the launcher process 510 may first locally launch (512) a third process 520. The third process may further communicate with (522) the outsourcing process 540 to launch the first process 550. In some embodiments, the third process 520 may be a kind of terminal process, such as a gnome-terminal process in a Linux system, and the outsourcing process 506 may be a system daemon process.

Figures 7A, 7B, 7C, 7D:
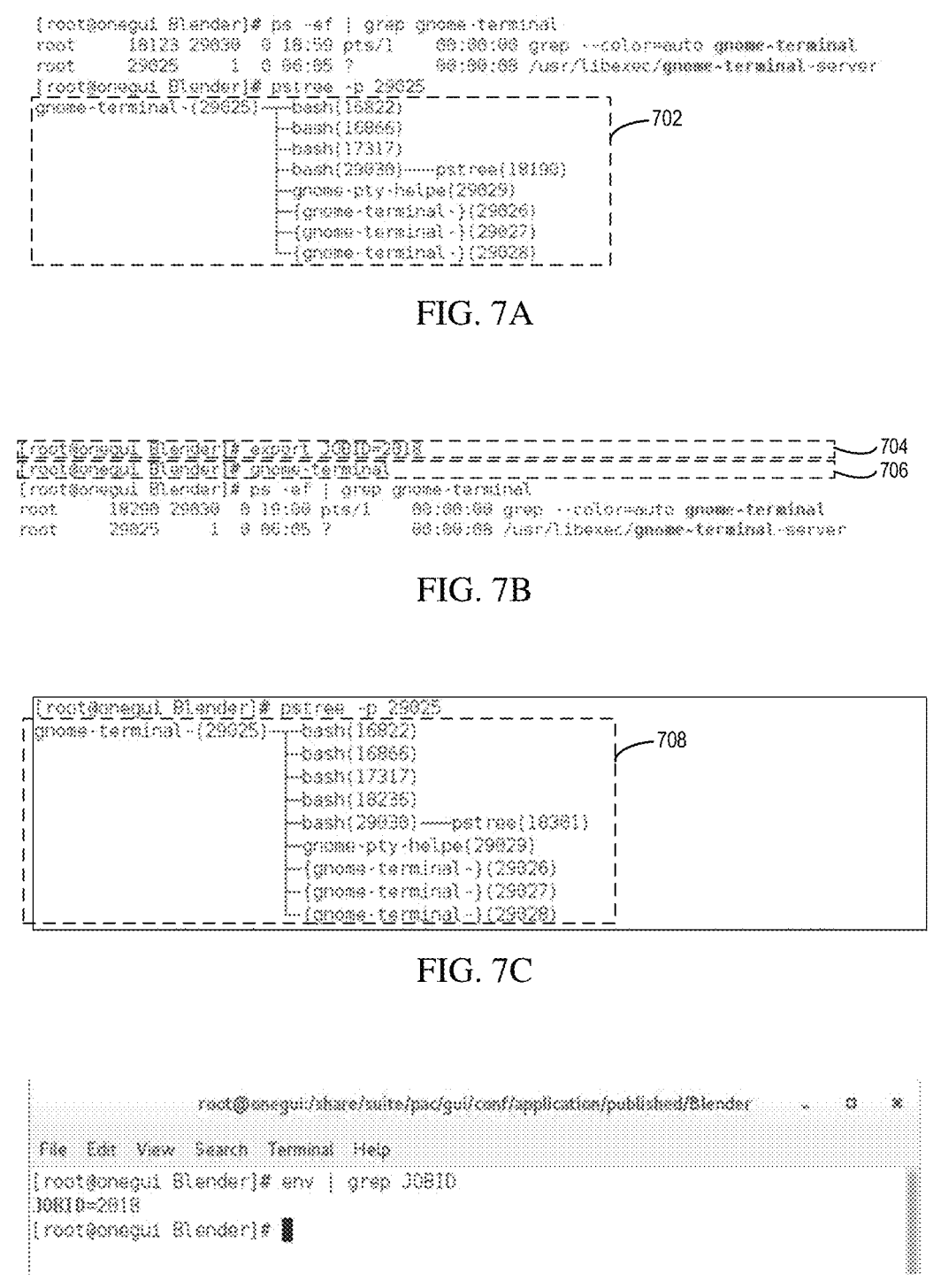

FIGS. 7A-7D show an example procedure of requesting an outsourcing process to launch a process in a Linux system, where a gnome-terminal process is an example of the third process 520 and a gnome-terminal-server process is an example of the outsourcing process 540. FIG. 7A shows a process tree 702 of the "gnome-terminal-server" outsourcing process (with an identity of 29025) 540 before receiving a request for processing a job 560. Upon the request for processing a job, a local "gnome-terminal" process (the third process) 520 may be created through a command "gnome-terminal" 706. As shown in FIG. 7B, a "ps" command is input for showing the processes having the name "gnome-terminal". It can be seen that there is only a "gnome-terminal-server" process. That is, the "gnome-terminal" process 520 has been terminated after communicating with the "gnome-terminal-server" process 540.

Additionally, as seen in FIG. 7C, upon the completion of the second process 520, the process tree 708 for the outsourcing process 540 is updated. As compared with the former process tree 702, a new bash process (the first process) 550 with an identity of 18236 is created by the outsourcing process 540 to process the job 560. In this example, as stated above, the third process 520 may be monitored through a monitor list 580 associated with the job 560, and the first process 550 may be monitored through a monitor list 590 associated with the outsourcing job 570. In some embodiments, the monitor lists 580 and 590 may be control groups (cgroup) in a Linux system.

In some embodiments, before launching the launcher process 510, an identity of the job 560 may be configured as an environmental parameter for the launcher process 510. For example, as shown in FIG. 7B, the identity of the job 560 may be configured as "2018" using an "export" command 704. Since the third process 520 is created by the launcher process 510, the identity of the job 560 "2018" is automatically assigned to the third process 520 as an environmental parameter.

The identity of the job 560 "2018" is further passed to the outsourcing process 540 as an environmental parameter for the first process 550 to be launched. As shown in FIG. 7D, the first process 550 has been assigned with the identity of the job 560 "2018" as an environmental parameter after being launched by the outsourcing process 540. With the identity of the job 560 as an environmental parameter, it may be determined that the first process 550 is associated with the job 560, thereby facilitating the management of the first process 550 with respect to the job 560.

Referring again to FIG. 6, at block 604, the launcher process 510 locally creates (514) a second process 530. In some embodiments, for the purpose of preventing the termination of the launcher process 510, the launcher process 510 may create the second process 530 prior to the termination of the third process 520. For example, the launcher process 510 may launch the third process 520 and the second process 530 at one time. In this manner, due to the presence of the working second process 530, the incorrect termination of the launcher process 510 may be avoided. The system therefore would not believe, mistakenly, that the job has been finished in the case the first process 550 is still working.

At block 606, the launcher process 510 associates the second process 530 with the identity of the job 560 to enable the second process 530 to manage the first process 550 based on the identity of the job 560. In some embodiments, the launcher process 510 may automatically assign the identity of the job 560 to the second process 530 as an environmental parameter. With the identity of the job 560, the second process 530 may determine that the first process 550 belongs to the job 560.

In some embodiments, the second process 530 may be a SetUID process in a Linux system, which has a system level authority (such as a root authority) to modify process-tracking status. In particular, the second process 530 may have an authority to move a process-identity of one process, which is used for uniquely identifying the process, from a monitor list to another monitor list. For example, the second process 510 may move the process-identity of the first process 550 from the monitor list 590 to the monitor list 580 associated with the job 560. Then the first process 550, as well as its descendant processes thereof, may be monitored through the monitor list 580. The first process 550, as well as its descendant processes thereof, may be also well managed with respect to the job 560. For example, the resources used by the job 560 may be determined accurately, thereby improving the load balance and job scheduling of the system. Further, all the processes relating to the job, including the first process 550, may be killed, for example upon receiving a user request or detecting that a related process relating to the job has crashed. The process for managing the first process 550 based on the identity of the job will be described in detail with reference to FIG. 8 and FIGS. 9A to 9C.

Figure 8:
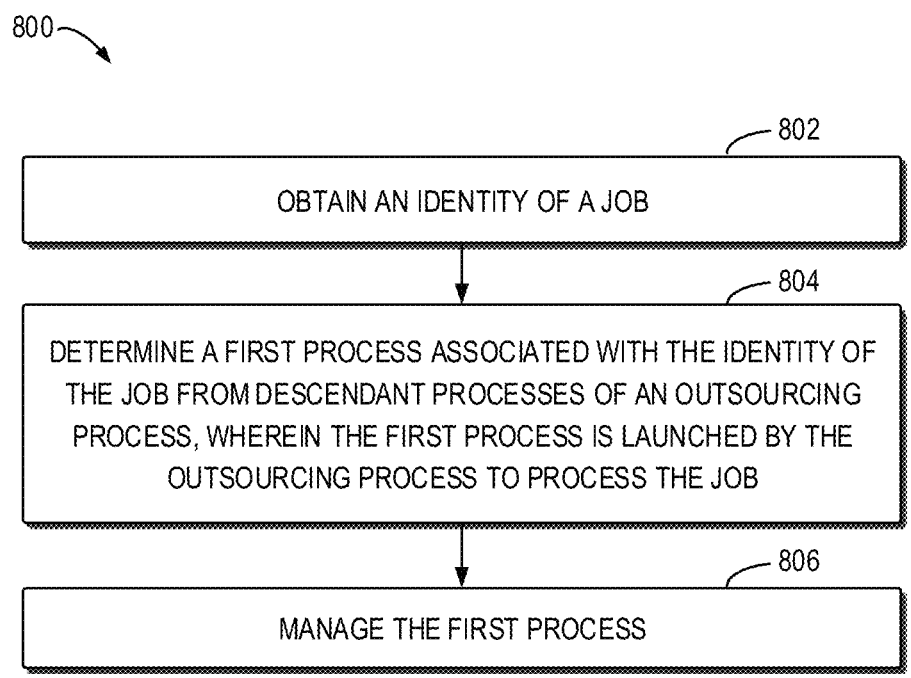
FIG. 8 is a flowchart of a method for tracking processes according to another embodiment of the present disclosure.

FIG. 8 shows a flowchart of a method 800 for tracking processes according to an embodiment of the present disclosure. The method 800 may be at least in part implemented by the second process 530 of FIG. 5.

At block 802, the second process 530 obtains an identity of a job 560. As described above, an identity of a job 560 may be assigned to the second process 530 by the launcher process 510 as an environmental parameter. Continuing the example as illustrated in FIG. 7A to 7D, in a Linux system, the environmental parameters may be saved in a "/proc/" file system. In one embodiment, the second process 530 may obtain the identity of the job 560 through for example querying the "/proc/" file system.

At block 804, the second process 530 determines (532) a first process 550 associated with the identity of the job 560 from descendant processes of an outsourcing process 540, wherein the first process 550 is launched by the outsourcing process 530 to process the job 560.

In some embodiments, the second process 530 may scan all the descendant processes of the outsourcing process 540 by using the identity of the job 560. The first process 550, which has the identity of the job 560 as an environmental parameter, may then be determined. For example, as shown in FIG. 9A, the second process 530 may search, based on the identity of the job (such as 2018), the "/proc/" file system, and determines that the first process 550 (with the identity 18236) has an environmental parameter of the identity of the job 560 "2018".

Typically, a single third process (job process) 520 is created with respect to a single job 560, and a single outsourcing process 540 would in turn be requested by the third process 520 to create a single first process 550. The first process 550 may further launch a plurality of descendant processes for performing the job 560. In some embodiments, there may be a plurality of active outsourcing processes, and one outsourcing process may launch a plurality of descendant processes to perform different jobs. In this case, each of the descendant processes launched by an outsourcing process is associated with an identity of a respective job, and the second process 530 may scan all the descendant processes of the plurality of active outsourcing processes to search for the first process 550. It is noted that the descendant processes of the first process 550 would be easily managed when the first process 550 is determined. Accordingly, the second process 530 may cease scanning once the first process 550 is determined by the second process 530.

At block 806, the second process 530 manages the first process 550. In some embodiments, the second process 530 may manage the first process 550 by adding the process-identity of the first process 550 to the monitor list 580 associated with the job 560. For example, the second process may move (592) the process-identity of the first process 550 from the monitor list 590 to the monitor list 580 associated with the job 560. Accordingly, the first process 550, as well as its descendant processes thereof, may be monitored through the monitor list 580, and the first process 550, as well as its descendant processed thereof, may be well managed with respect to the job 560.

For example, as shown in FIG. 9B, the process-identity "18236" of first process 508 is recorded in the control group 590 of an outsourcing job 570 in default. After determining that the first process 550 is associated with the job 560, the second process 530 may add the process-identity "18236" of the first process 550 to the control group 580 associated with the job 560. For example, in a Linux system, the second process 530 may use the "cat" command 902 as shown in FIG. 9C to implement the moving action (592). After the process-identity of the first process 550 has been added to the control group 580 associated with the job 560, the first process 550, as well as its descendant processes thereof, may be then monitored through the monitor list 580. Besides, the first process 550, as well as its descendant processed thereof, may be well managed with respect to the job 560. For example, the resources used by the job 560 may be determined accurately, thereby improving the load balance and job scheduling of the system. Further, all the processes relating to the job, including the first process 550, may be killed for example upon receiving a user request or detecting that a related process relating to the job has crashed.

In some embodiments, the second process 530 may terminate upon finishing adding the process-identity of the first process 550 to the monitor list 580 associated with the job 560. For example, the second process 530 may terminate by sending to the system a request for terminating the second process 530. In this manner, since the process-identity of the first process 550 has been added to the monitor list 580 associated with the job 560, the launcher process 510 would be aware of that there is still an operating first process 550 associated with the job 560. The launcher process would not terminate even if the second process 530 terminates. Accordingly, it is possible to tracking the status of the first process 550 relating to the job 560, without bring additional overheads by the second process 520.

Through the proposed embodiments, the processes launched by an outsourcing process may be managed by a locally created process based on an identity of a job, and the locally created process may terminate upon finishing the management. In addition, the locally created process is launched by a launcher process, which will not show any effect on the job process. Therefore, the solution proposed in the embodiments can be used to efficiently track processes launched by an outsourcing process without introducing additional overheads.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    associating a first process with an identity of a job, wherein the first process is launched by an outsourcing process to process the job;
    locally creating a second process;
    associating the second process with the identity of the job to enable the second process to manage the first process based on the identity; and
    locally creating a third process for communicating with the outsourcing process to launch the first process.

2. The method of claim 1, wherein locally creating the second process comprises:
    creating the second process prior to termination of the third process.

3. The method of claim 1, wherein the second process has a system-level authority.

4. The method of claim 1, wherein associating the first process with the identity of the job comprises:
    assigning the identity of the job to the first process as an environmental parameter.

5. A system for process tracking, comprising:
    one or more processors;
    a memory coupled to at least one of the one or more processors;
    a set of computer program instructions stored in the memory and executed by at least one of the one or more processors to perform actions of:
    associating a first process with an identity of a job, wherein the first process is launched by an outsourcing process to process the job;
    locally creating a second process;
    associating the second process with the identity of the job to enable the second process to manage the first process based on the identity;
    locally creating a third process for communicating with the outsourcing process to launch the first process.

6. The system of claim 5, wherein locally creating the second process comprises:
    creating the second process prior to termination of the third process.

7. The system of claim 5, wherein the second process has a system-level authority.

8. The system of claim 5, wherein associating the first process with the identity of the job comprises:
    assigning the identity of the job to the first process as an environmental parameter.

9. A computer program product being tangibly stored on a non-transient machine-readable medium and comprising machine-executable instructions, the instructions, when executed on a device, causing the device to perform actions including:
    obtaining an identity of a job;
    determining a first process from descendent processes of an outsourcing process;
    associating the first process with the identity of the job, wherein the first process is launched by the outsourcing process to perform the job;
    locally creating a second process;
    associating the second process with the identity of the job to enable the second process to manage the first process based on the identity; and
    managing the first process and the second process.

10. The computer program product of claim 9, the actions further comprising:
    locally creating a third process for communicating with the outsourcing process to launch the first process.

11. The computer program product of claim 10, wherein creating the second process comprises:
    creating the second process prior to termination of the third process.

12. The computer program product of claim 9, wherein the second process has a system-level authority.

13. The computer program product of claim 9, wherein associating the first process with the identity of the job comprises:

assigning the identity of the job to the first process as an environmental parameter.

14. The computer program product of claim 9, wherein managing the first process and the second process comprises:
adding a new process-identity of the first process to a monitor list associated with the job; and
adding a second new process-identity of the second process to the monitor list associated with the job.

15. The computer program product of claim 14, further comprising:
in response to adding the process-identity of the second process to the monitor list associated with the job, causing the first process to be terminated.

* * * * *